US006957397B1

(12) United States Patent
Hawkins et al.

(10) Patent No.: US 6,957,397 B1
(45) Date of Patent: Oct. 18, 2005

(54) NAVIGATING THROUGH A MENU OF A HANDHELD COMPUTER USING A KEYBOARD

(75) Inventors: Jeffrey C. Hawkins, Atherton, CA (US); Robert Y. Haitani, Menlo Park, CA (US); Debbie O. Chyi, Burlingame, CA (US); William B. Rees, Menlo Park, CA (US); Vitaly Kruglikov, Palo Alto, CA (US)

(73) Assignee: Palm, Inc., Sunnyvale, CA (US)

( * ) Notice: Subject to any disclaimer, the term of this patent is extended or adjusted under 35 U.S.C. 154(b) by 497 days.

(21) Appl. No.: 09/976,333

(22) Filed: Oct. 12, 2001

Related U.S. Application Data

(60) Provisional application No. 60/297,817, filed on Jun. 11, 2001.

(51) Int. Cl.⁷ .............................................. G09G 5/00
(52) U.S. Cl. ..................... 715/856; 715/810; 715/864
(58) Field of Search ............................... 345/864, 157, 345/169, 168, 810; 455/3.01, 557; 715/856, 715/864, 810

(56) References Cited

U.S. PATENT DOCUMENTS

| 4,279,021 A | 7/1981 | See et al. |
| 4,415,065 A | 11/1983 | Sandstedt |
| 4,545,023 A | 10/1985 | Mizzi ........................ 364/709 |
| 4,587,630 A | 5/1986 | Straton et al. |
| 4,725,694 A | 2/1988 | Auer et al. |
| 4,916,441 A | 4/1990 | Gombrich |
| 4,972,457 A | 11/1990 | O'Sullivan .................... 379/59 |
| 5,067,164 A | 11/1991 | Denker et al. |
| 5,101,439 A | 3/1992 | Kiang |
| 5,127,041 A | 6/1992 | O'Sullivan .................... 379/59 |
| RE34,034 E | 8/1992 | O'Sullivan .................... 375/59 |
| 5,189,632 A | 2/1993 | Paajanen et al. ........ 364/705.05 |
| 5,227,614 A | 7/1993 | Danielson et al. |
| 5,249,218 A | 9/1993 | Sainton ........................ 375/59 |
| 5,334,824 A | 8/1994 | Martinez |
| 5,335,276 A | 8/1994 | Thompson et al. ........... 380/21 |
| 5,353,334 A | 10/1994 | O'Sullivan .................... 379/59 |
| 5,367,563 A | 11/1994 | Sainton ........................ 379/98 |
| D354,478 S | 1/1995 | Miyahara |
| 5,379,057 A | 1/1995 | Clough et al. |
| 5,392,447 A | 2/1995 | Schlack et al. |
| D359,734 S | 6/1995 | Nagele et al. ............. D14/138 |
| 5,436,960 A | 7/1995 | Campana, Jr. et al. ........ 379/58 |
| 5,438,611 A | 8/1995 | Campana, Jr. et al. ........ 379/58 |

(Continued)

FOREIGN PATENT DOCUMENTS

CA           2187050           5/1997

(Continued)

OTHER PUBLICATIONS

U.S. Appl. No. 07/831,671.

(Continued)

*Primary Examiner*—John Cabeca
*Assistant Examiner*—Ting Zhou
(74) *Attorney, Agent, or Firm*—Fenwick & West LLP

(57) ABSTRACT

A technique to navigate through one or more menus of a handheld computer is disclosed. In one embodiment, the technique uses a handheld device having a first button to cause a cursor to navigate through a plurality of menu items and to highlight a desired menu item. The device also has a second button to cause the cursor to navigate through a plurality of menus when the cursor is highlighting one of the menus or a first menu item, and to cause the cursor to highlight a previous menu item when the cursor is highlighting a menu item other than the first menu item.

30 Claims, 10 Drawing Sheets

U.S. PATENT DOCUMENTS

| | | | |
|---|---|---|---|
| 5,446,759 A | 8/1995 | Campana, Jr. et al. | 375/267 |
| 5,465,401 A | 11/1995 | Thompson | |
| 5,479,472 A | 12/1995 | Campana, Jr. et al. | 375/58 |
| 5,485,373 A | 1/1996 | Davis et al. | |
| 5,496,992 A | 3/1996 | Madan et al. | |
| 5,550,715 A | 8/1996 | Hawkins | 362/31 |
| 5,584,054 A | 12/1996 | Tyneski et al. | 455/89 |
| 5,594,640 A | 1/1997 | Capps et al. | |
| 5,625,670 A | 4/1997 | Campana, Jr. et al. | 379/58 |
| 5,631,946 A | 5/1997 | Campana, Jr. et al. | 379/58 |
| 5,640,146 A | 6/1997 | Campana, Jr. et al. | 379/58 |
| 5,640,444 A | 6/1997 | O'Sullivan | 379/59 |
| 5,650,769 A | 7/1997 | Campana, Jr. et al. | 340/573 |
| D385,875 S | 11/1997 | Harris et al. | |
| D386,497 S | 11/1997 | Huslig et al. | |
| 5,694,428 A | 12/1997 | Campana, Jr. et al. | 375/260 |
| 5,710,798 A | 1/1998 | Campana, Jr. et al. | 375/347 |
| 5,714,937 A | 2/1998 | Campana, Jr. et al. | 340/573 |
| 5,717,725 A | 2/1998 | Campana, Jr. et al. | 375/347 |
| 5,722,059 A | 2/1998 | Campana, Jr. et al. | 455/226.2 |
| 5,722,064 A | 2/1998 | Campana, Jr. et al. | 455/351 |
| D393,856 S | 4/1998 | Lee et al. | D14/138 |
| 5,742,644 A | 4/1998 | Campana, Jr. et al. | 375/316 |
| 5,745,532 A | 4/1998 | Campana, Jr. et al. | 375/347 |
| 5,751,773 A | 5/1998 | Campana, Jr. et al. | 375/346 |
| D395,300 S | 6/1998 | Yamazaki et al. | |
| 5,761,621 A | 6/1998 | Sainton | 455/453 |
| 5,797,089 A | 8/1998 | Nguyen | |
| 5,797,098 A | 8/1998 | Schroeder et al. | |
| 5,805,633 A | 9/1998 | Uddenfeldt | 375/202 |
| 5,812,117 A | 9/1998 | Moon | 345/691 |
| 5,818,437 A | 10/1998 | Grover et al. | |
| 5,819,172 A | 10/1998 | Campana, Jr. et al. | 455/412 |
| 5,825,353 A * | 10/1998 | Will | 345/184 |
| 5,825,675 A | 10/1998 | Want et al. | |
| 5,854,985 A | 12/1998 | Sainton et al. | 455/553 |
| 5,864,805 A | 1/1999 | Chen et al. | |
| 5,884,323 A | 3/1999 | Hawkins et al. | |
| D408,021 S | 4/1999 | Haitani et al. | |
| D408,030 S | 4/1999 | Richards et al. | |
| D409,185 S | 5/1999 | Kawashima | |
| D410,486 S | 6/1999 | Takahata et al. | |
| 5,966,671 A * | 10/1999 | Mitchell et al. | 455/550.1 |
| D416,001 S | 11/1999 | Tal et al. | |
| D416,256 S | 11/1999 | Griffin et al. | |
| 5,983,073 A | 11/1999 | Ditzik | |
| 5,990,872 A | 11/1999 | Jorgenson et al. | |
| 6,000,000 A | 12/1999 | Hawkins et al. | |
| 6,006,274 A | 12/1999 | Hawkins et al. | |
| D421,744 S | 3/2000 | Ono | |
| 6,040,829 A * | 3/2000 | Croy et al. | 345/864 |
| 6,043,760 A | 3/2000 | Laakkonen | |
| D423,468 S | 4/2000 | Jenkins | |
| 6,058,304 A | 5/2000 | Callaghan et al. | |
| 6,067,451 A | 5/2000 | Campana, Jr. et al. | 455/412 |
| D432,099 S | 10/2000 | Loh et al. | |
| D432,535 S | 10/2000 | Loh et al. | |
| D433,016 S | 10/2000 | Matsuda et al. | |
| 6,134,453 A | 10/2000 | Sainton et al. | 455/553 |
| 6,141,540 A | 10/2000 | Richards et al. | |
| 6,169,485 B1 | 1/2001 | Campana, Jr. et al. | 340/573 |
| 6,188,789 B1 | 2/2001 | Marianetti II et al. | 382/189 |
| D439,232 S | 3/2001 | Ledingham et al. | |
| 6,198,783 B1 | 3/2001 | Campana, Jr. et al. | 375/346 |
| 6,204,848 B1 | 3/2001 | Nowlan et al. | |
| RE37,141 E | 4/2001 | O'Sullivan | 455/557 |
| D440,959 S | 4/2001 | Wolf et al. | |
| 6,219,694 B1 | 4/2001 | Lazaridis et al. | 709/206 |
| D442,156 S | 5/2001 | Lee | |
| D443,865 S | 6/2001 | Kim | |
| D446,199 S | 8/2001 | Xu et al. | |
| 6,272,190 B1 | 8/2001 | Campana, Jr. et al. | 375/345 |
| 6,278,442 B1 | 8/2001 | Griffin et al. | 345/169 |
| 6,288,718 B1 | 9/2001 | Laursen et al. | |
| 6,295,372 B1 | 9/2001 | Hawkins et al. | |
| 6,295,460 B1 | 9/2001 | Nagel et al. | 455/557 |
| 6,307,548 B1 | 10/2001 | Flinchem et al. | |
| D450,307 S | 11/2001 | Xu et al. | |
| 6,317,592 B1 | 11/2001 | Campana, Jr. et al. | 455/412 |
| 6,330,618 B1 | 12/2001 | Hawkins et al. | |
| D454,349 S | 3/2002 | Makidera et al. | |
| D455,135 S | 4/2002 | Hyun | |
| 6,370,518 B1 | 4/2002 | Payne et al. | |
| D456,805 S | 5/2002 | Ono et al. | |
| 6,397,078 B1 | 5/2002 | Kim | |
| 6,477,482 B1 | 11/2002 | Maupin et al. | |
| 6,489,950 B1 | 12/2002 | Griffin et al. | |
| 6,549,304 B1 * | 4/2003 | Dow et al. | 358/473 |
| 6,611,697 B1 | 8/2003 | Ewing et al. | |
| 6,662,244 B1 | 12/2003 | Takahashi | |
| 6,725,060 B1 | 4/2004 | Chhatriwala et al. | |
| 6,727,916 B1 * | 4/2004 | Ballard | 345/758 |
| 2001/0027121 A1 | 10/2001 | Boesen | |
| 2002/0021311 A1 | 2/2002 | Schecter et al. | |
| 2002/0086702 A1 | 7/2002 | Lai et al. | |
| 2002/0097227 A1 | 7/2002 | Chu et al. | |
| 2002/0126097 A1 | 9/2002 | Savolainen | |
| 2002/0186262 A1 * | 12/2002 | Itavaara et al. | 345/864 |
| 2003/0123627 A1 | 7/2003 | Pinard et al. | |
| 2004/0047505 A1 * | 3/2004 | Ghassabian | 382/186 |

FOREIGN PATENT DOCUMENTS

| | | | |
|---|---|---|---|
| EP | 0149762 A1 | 7/1986 | |
| EP | 0 813 328 A2 | 12/1997 | |
| EP | 0 840 834 B1 | 4/1999 | H01H 13/70 |
| WO | WO 94/10678 | 5/1994 | G09G 5/14 |
| WO | WO 94/16408 | 7/1994 | G06K 9/00 |
| WO | WO 96/01453 | 1/1996 | G06K 9/00 |
| WO | WO 00/65445 | 11/2000 | G06F 11/00 |

OTHER PUBLICATIONS

U.S. Appl. No. 09/670,696.
U.S. Appl. No. 09/813,165.
BlackBerry Handheld Users Guide, Sep. 7, 1999.
BlackBerry Developer's Guide SDK User's Guide Version 2.0 (Data TAC), Jun. 12, 2000.
BlackBerry Desktop Software Installation and Getting Started Guide, Feb. 5, 1999.
BlackBerry Enterprise Server Software Installation and Getting Started Guide, Sep. 29, 1999.
Compaq Product Information, *iPAQ Pocket PC Options*, retrieved from internet: www.compaq.com/products/handhelds, Nov. 13, 2001.
Choi, H., *First Look: Samsung 1300 Cellphone/PDA*, retrieved from internet www.techtv.com, Mar. 28, 2001.
Handspring Product Information: *VisorPhone The Springboard Module that Transforms your Visor into an Extraordinary Phone*, (2000).
Handspring, *Sprint and Airprime Delivery First Wireless CDMA Phone and Data Module for the Handspring Visor*, retrieved from internet www.handspring/pr59.jhtml Aug. 2, 2001.
Handspring VisorPhone Module User Guide, (2001).
U.S. Appl. No. 09/835,464.
U.S. Appl. No. 09/953,211.
IBM Technical Disclosure Bulletin: *SimpleUser Interface to a Cellular Telephone*, retrieved from internet, Oct. 2001.
IBM Technical Disclosure Bulletin: *Inexpensive Personal Digital Assistant*, retrieved from internet, Apr. 2001.

Kyocera's Smartphone Series, retrieved from internet www.kyocera-wireless.com, Apr. 2001.

Mossberg, W., *Samsung Embeds Cellphone Inside Palm in New I300 Device*, retrieved from internet http://www.ptech.wsj.com/archive/ptech-20010830.html, Oct. 26, 2001.

Newspaper Article: *Ways to Escape Multiple—Remote Hell*, San Jose Mercury News, Jun. 14, 2001.

Nokia 9110 Accessories Quick Guide Instruction Manual.

Sprint PCS User Guide—Samsung Model SCH-8500.

Tam, P., "Palm, Motorola to Make PDA Cell Phones", retrieved from internet http://www.zdnet.com/zdnn/stories/news/0,4586,2631800,00.html, Sep. 25, 2000.

Technical White Paper BlackBerry Enterprise Edition for Microsoft Exchange, Version 2.1, (2001).

Technical White Paper BlackBerry Enterprise Server for Microsoft Exchange, Version 2.1, (2001).

TUCOWS PDA Phone GSM Dailer: GSM Dailer 1.0 retrieved from internet http://pds.rcp.net/pe/pocket/preview154208.html, Jun. 19, 2001.

*American Programmer*, N.Y., American Programmer, Inc. (Dec. 1991), pp. 4-33.

*At Last, Technology Harnesse [sic] One of the Most Powerf [sic] Forces known to Man.*, Foster City, GO Corporation, 1991, 14 pages.

AT&T New Release, *NCR Cuts Price of 3170 Notebook Computer 11 to 19 Percent* [online]. (Mar. 8, 1993), Retrieved from the Internet: <URL:http://www.att.com/press/0393/930308.nca.html> 2 pages.

Carr, R.M., *The Point of the Pen, Byte* (Feb. 1991, Reprinted), 10 pages.

Cullen, A., *Connecting With Your EO Cellular Module*, Mountain View, EO, Inc., 1992, 1993, pp. ii-33.

Cullen, A., *Getting Started With Your EO Personal Communicator*, Mountain View, EO, Inc., 1992, 1993, pp. ii-74.

Cullen, A., *Lookup Guide to the EO Personal Communicator*, Mountain View, EO, Inc., 1992, 1993, pp. ii-320.

*Go Corporation Information Statement*, (Nov. 8, 1993), 114 pages.

*IBM Selects Racotek Data/Voice Communications Services to Interface With Touchmobile Product*, PR Newswire (Jan. 25, 1993), 2 pages.

*IBM TouchMobile Information and Planning Guide*, International Business Machines Incorporated (Mar. 1993), 20 pages.

*IBM TouchMobile Solution for Data Capture and Communication, Keeping Your Business Moving in the 90s*, International Business Machines Incorporated (Jan. 1993), 13 pages.

*IBM'S Touchmobile Helps Field Workers Collect Data at the Touch of a Finger*, PR Newswire (Jan. 26, 1993), 2 pages.

MacNeill, D., *Messaging Card and NewtonMail: We Pick Up and Deliver*, On The Go Magazine [online]. (Oct. 13, 1993), Retrieved from the Internet: <URL:http://www.pencomputing.com/Newton/NewtonNotes2.html> 2 pages.

MacNeill, D., *Wireless Newton Technology Goes to Work*, On The Go Magazine [online]. (Sep. 8, 1993). Retrieved from the Internet: <URL:http://www.pencomputing.com/Newton/NewtonNotes1.html >2 pages.

Maki, K., *The AT&T EO Travel Guide*, N.Y., John Wiley & Sons, Inc., 1993, pp. iii-555.

Schlender, B. R., *Hot New PCs That Read Your Writing, Fortune* (Feb. 11, 1991, Reprinted), 6 pages.

Stock, R., *The World of Messaging An Introduction to Personal Communications*, Mountain View, EO, Inc., 1992, 1993, pp. ii-69.

User'Guide, hp iPAQ Pocket PC h4000 Series, Document Part No.: 343434-001, Aug. 2003, 141 pages.

SyncML Website Introduction Page, SycnML Initiative LTD., [Retrieved on Oct. 24, 2002]. Retrieved from the Internet: <URL: http://www.syncml.org/about-intro.html>, 2 pages.

SynML Sync Protocol [Retrieved on Dec. 7, 2000]. Retrieved from the Internet: <URL:http://www.syncml.org/docs/syncml_protocol_v10_20001207.pdf>, 60 pages.

SynML Sync Protocol Version 1.0.1 [Retrieved on Jun. 15, 2001]. Retrieved from the Internet: <URL:http://www.syncml.org/docs/syncml_protocol_v101_20010615.pdf>, 61 pages.

Wireless Application Protocol, Service Loading, WAP-168-ServiceLoad-200110731-a, Version Jul. 31, 2001, 18 pages.

Wireless Application Protocol, Service Indication, WAP-167-ServiceInd-200110731-a, Version Jul. 31, 2001, 28 pages.

Wireless Application Protocol, Push Message, WAP-251-PushMessage-20010322-a, Version Mar. 22, 2001, 14 pages.

Wireless Application Protocol, WAP-Sync-Spec, Data Synchronisation Specification, WAP-234-SYNC-20010530-a, Version May 30, 2001, 11 pages.

Wireless Application Protocol, Wireless Application Protocol, Wireless Markup Language Specification Version 1.3, WAP WML, WAP-191-WML, Feb. 19, 2000, 110 pages.

* cited by examiner

NAVIGATING THROUGH A MENU OF A HANDHELD COMPUTER USING A KEYBOARD

CROSS-REFERENCE TO RELATED APPLICATION

This application claims the benefit of U.S. Provisional Application No. 60/297,817 entitled "Handheld Device" which was filed on Jun. 11, 2001, the disclosure of which is incorporated herein by reference.

FIELD OF THE INVENTION

The invention is related to the field of handheld computers.

BACKGROUND OF THE INVENTION

Handheld computers are becoming ubiquitous. These handheld devices are also referred to as personal digital assistants (PDA), pocket personal computers (pocket PC), or palmtop computers. A handheld computer may be small enough to fit into a purse or a pocket, and may weigh less than one pound. As a result, the handheld computer is very portable.

A person can interact with the handheld computer using a stylus, or pen, to touch a portion of the display screen. Electronic sensors in a display screen of the handheld computer detect the point of contact between the stylus and the screen. The user can input information into the handheld computer by tracing the shape of a character on the display screen. The user can also cause the handheld computer to perform a function by touching the name of the function when the name is displayed on the screen.

However, a conventional desktop computer typically moves a cursor through a series of menus by receiving user input from keyboard keys, such as arrow keys for example, or from a mouse. As a result, using a stylus to navigate through menus may be difficult for an inexperienced user, and even awkward for a user with some experience. Using keys to receive user input may be more convenient, however, traditional key-based solutions require four or more keys to move a cursor. This large number of keys dedicated to cursor movement may be acceptable in conventional desktop keyboards because the size of the keyboard is typically large enough to accommodate this large number of keys. However, in a handheld computer, reducing the number of keys on the keyboard is important because of the comparatively small amount of space available for keyboard keys. Thus, a need exists to reduce the amount of keys required to move a cursor through menus and menu items of a handheld computer.

SUMMARY OF THE INVENTION

A technique to navigate through one or more menus of a handheld computer is disclosed. In one embodiment, the technique uses a handheld device having a first button to cause a cursor to navigate through a plurality of menu items and to highlight a desired menu item. The device also has a second button to cause the cursor to navigate through a plurality of menus when the cursor is highlighting one of the menus or a first menu item, and to cause the cursor to highlight a previous menu item when the cursor is highlighting a menu item other than the first menu item.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Navigating through a menu of a handheld computer using a keyboard is disclosed. The handheld computer may include multiple keyboard keys. Menus, such as a Palm operating system (Palm OS) menu for example, along with their corresponding menu items, are entirely keyboard navigable on the handheld computer. One key is used to place the handheld device in menu mode and to display a list of one or more menus. Another key can be used to navigate through the list of menus and to select a desired menu. Similarly, the items of a given menu can be navigated and selected using a third key. A selected item can be executed using one or more execution keys. Key based navigation allows the user to both input data and move through applications using only a keyboard, instead of having to switch between two modes of entry. Thus, a user who is already using the keyboard is relieved from the inconvenience of pulling out a stylus to execute menu items.

Because navigation, selection and execution of a menu item of the handheld computer can be performed with the keyboard, representations of computer functions and commands can be displayed as menu items with corresponding keyboard shortcuts. The functions or commands corresponding to the menu items may be implemented as software code in one or more software application programs. These programs may be stored in a computer readable memory of the handheld device and executed by a processor of the handheld device.

Figure 1A:
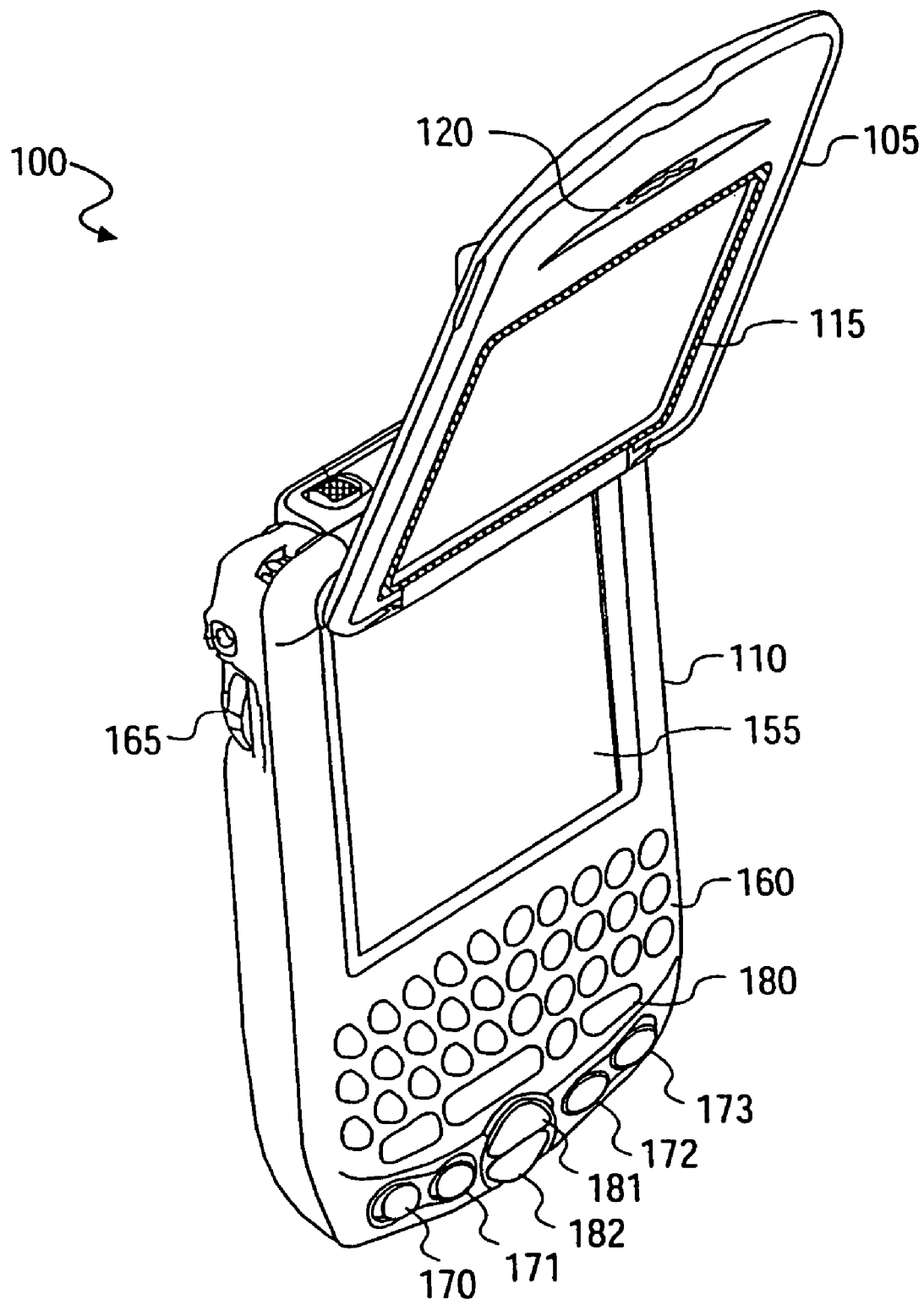
FIGS. 1A and 1B show an embodiment of a handheld computer that has navigation keys to allow a user to navigate through menus and functions.
Figure 1B:
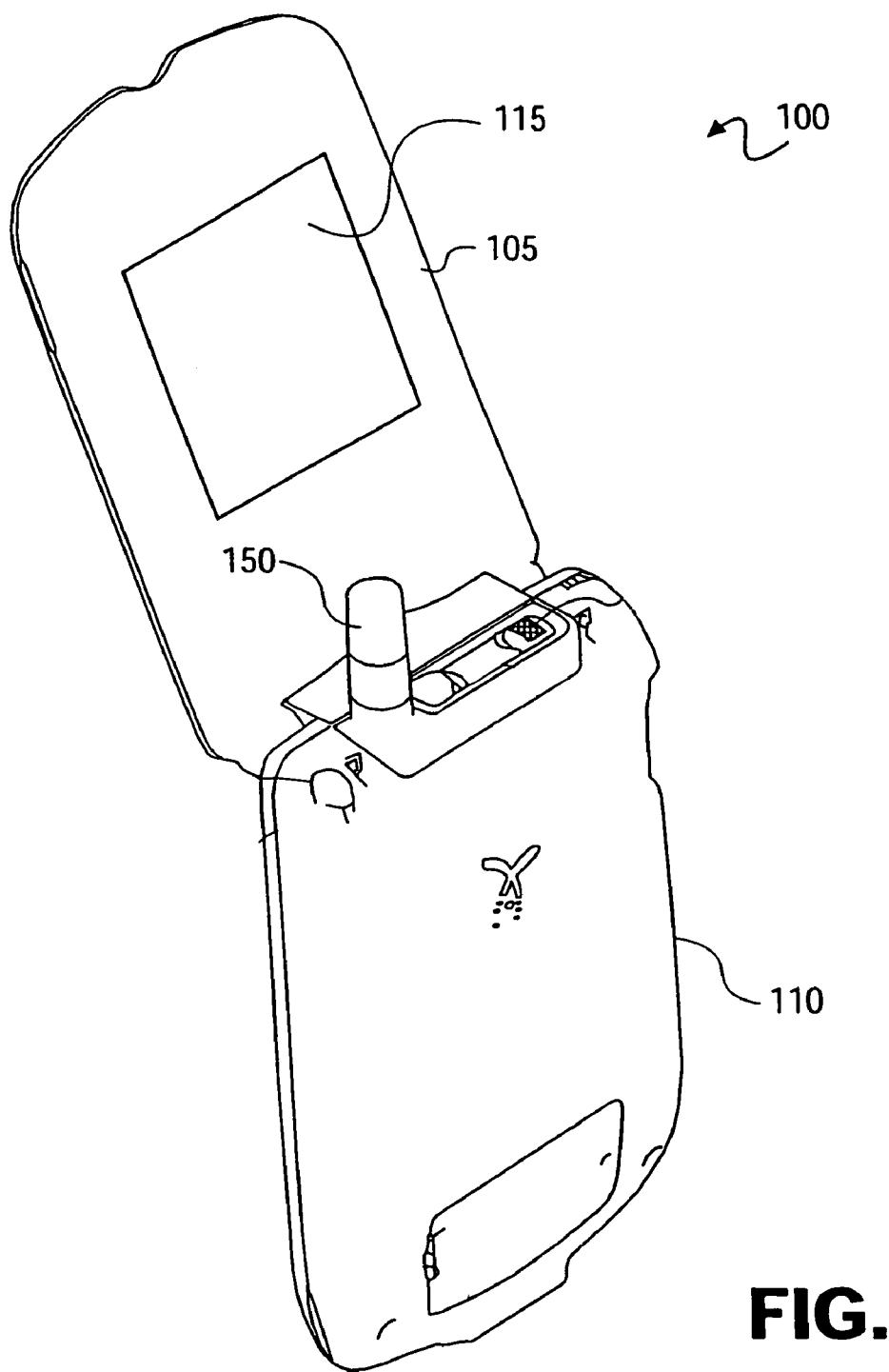

An example of a handheld computer having a keyboard that can be used to navigate through a menu is shown in FIGS. 1A and 1B. The handheld computer 100 includes a lid 105 and a body 110. The lid 105 may be attached to the body 110 using one or more hinges, so that the lid can operate as a flip-lid to cover and uncover the top of the body 10 of the handheld device 100. Lid 105, as shown in FIGS. 1A and 1B, is in an open position. The lid 105 may have a transparent portion 115, so that a user can view the display screen even if the lid is in a closed position. The lid may also have a speaker 120, which may be used by the device 100 in a wireless telephone application. As shown in FIG. 1B, the device includes an antenna 150 for the wireless telephone application.

The inside of the body 110 of handheld computer 100 contains computer hardware and electronic circuits, which may include a microprocessor for example. The hardware circuitry may also have a radio module, including a transmitter and receiver, so that the device can perform one or more radio communication functions, such as a cellular telephone function for example. The handheld computer also contains computer readable memory storing software such as application programs or digital data.

The hardware and the software interact to perform computer or communication functions. For example, the device may perform one of the functions by using the microprocessor to execute one of the stored computer programs. These functions may include personal information functions such as storing and retrieving address lists or calendars, and computing functions such as performing as a calculator or as an electronic word processor or spreadsheet. These functions may also include wireless communication functions such as telephone, internet, and electronic mail (email) applications.

The body 110 of handheld device 100 includes display screen 155, keyboard 160, and jog rocker 165. The keyboard 160 may have alphabet keys, numeric keys, or a combination of alpha-numeric keys. The keys of keyboard 160 may be arranged in any desired format. In one embodiment, keyboard 160 includes alpha-numeric keys arranged in a QWERTY format. The keyboard keys may also include dedicated hardware application buttons 170, 171, 172, and 173. Each application button, when pressed, causes the device to execute a corresponding application program.

For example, button 170 may cause a phone application to be executed so that the device functions as a cellular telephone. Button 171 may cause a calendar application to be executed so that a user can keep track of scheduled events and appointments. Button 172 may cause an internet browser application to be executed so that the device can be used to retrieve information from the internet. Button 173 may cause an electronic mail application to be executed so that the user can receive and send electronic mail using the handheld device. When a dedicated hardware application button is pressed, the device executes the corresponding software application program, and display screen shows a view of the current application program that is being executed by the device.

Keyboard 160 may also include additional buttons, such as menu button 180, and scroll buttons 181 and 182, for example. When menu button 180 is pressed, the device enters menu mode, which allows a user to navigate through menus for the current application by using keyboard 160 or jog rocker 165. When the device is in menu mode, one or more menus are displayed on screen 155. When a given menu is highlighted, a list of items associated with the menu may be displayed. Each menu item may be a command or a function that can be performed by the handheld device. The user can navigate through the displayed menus and menu items, and execute a desired menu item, using the buttons on the handheld device.

Figure 2:
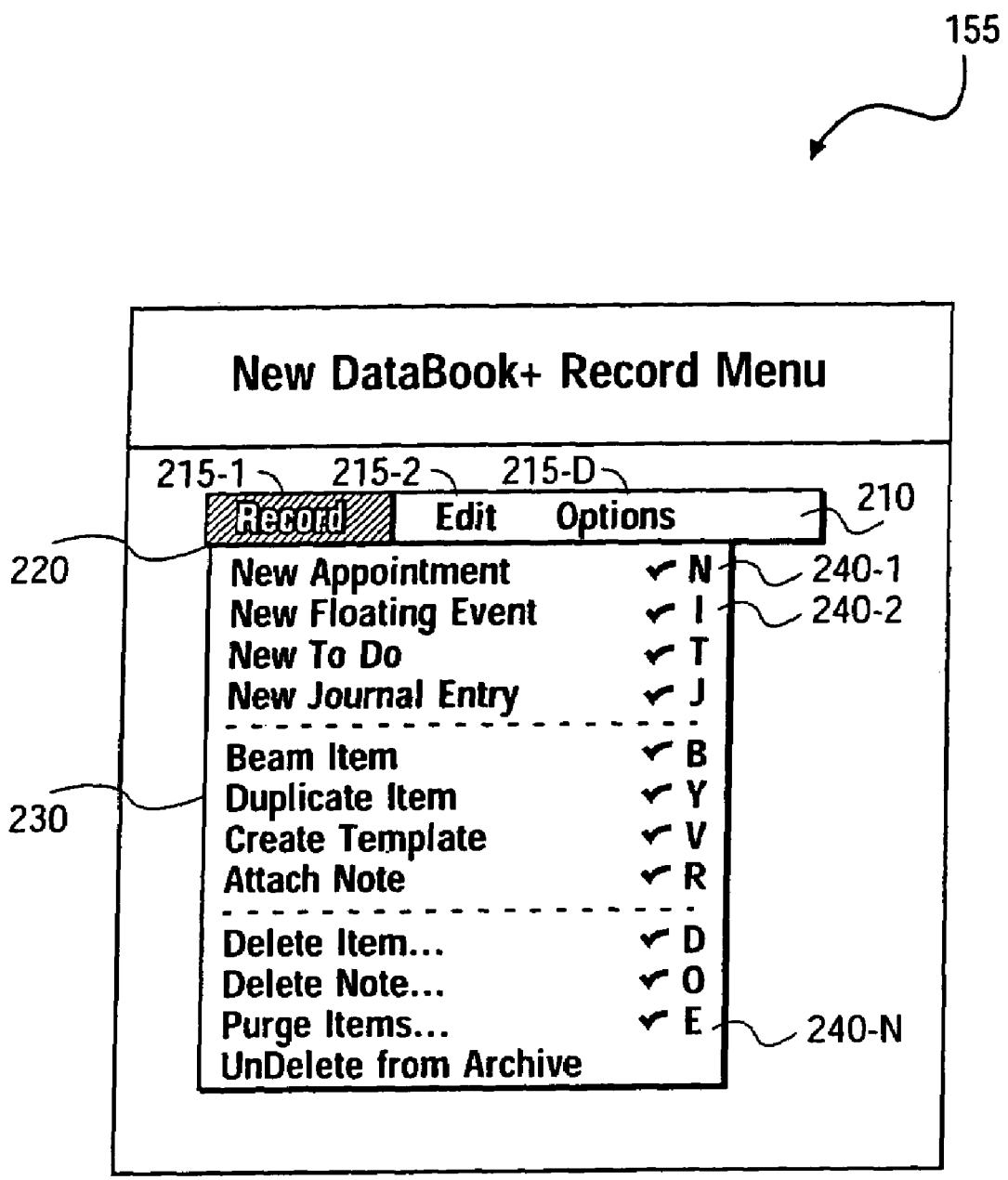
FIG. 2 shows an embodiment of a screen shot of the handheld computer's display screen including menus and menu items that may be accessed, navigated, and executed by a user with the keyboard or jog rocker.

Pressing menu key 180 causes the device to enter menu mode and to display one or more menus in a menu bar. For example, FIG. 2 shows an example of a screen shot of display screen 155 when the device is in menu mode. The screen displays menu bar 210. The menu bar includes one or more menus 215-1 to 215-D. In this example, the menus include 215-1, 215-2, and 215-D. Pressing and releasing the menu key a second time may dismiss the displayed menus. Alternatively, another key, such as a backspace key for example, may dismiss the displayed menu.

A cursor 220 can be moved to a given menu 215-1 to 215-D of menu bar 210 using a key, for example, scroll-up button 181. Pressing button 181 displays the next menu, and the corresponding menu items for the next menu. For example, cursor 220 may initially highlight one of the menus, such as record menu 215-1. Pressing button 181 when the cursor is highlighting a top menu item, or a menu, causes the cursor to move to another menu. As the cursor 220 moves from one menu, such as menu 215-1 for example, to another menu, such as adjacent menu 215-2 for example, menu 215-1 becomes unhighlighted and menu 215-2 becomes highlighted. Pressing button 181 from the last menu 215-$n$ may scroll the cursor, or highlight, back to the first menu 215-1. Holding button 181 may repeat this action of moving the cursor to the next menu at a given repeat rate. Thus, when the cursor is highlighting a menu name, pressing button 181 causes the cursor 220 to selectively highlight the next menu 215 in menu bar 210.

Each menu has a set 230 of one or more items associated with the menu. When a menu is highlighted, the set of items 230 associated with the highlighted menu, are displayed. For example, when the record menu is highlighted, record menu items 240-1 to 240-N are displayed.

Another key, such as scroll-down button 182 for example, can be used to selectively highlight one of the items in the list of menu items by moving cursor 220 to a given item when pressed one or more times. If no menu item is highlighted, such as when the menu list is first displayed, then the first press of button 182 may highlight the first menu item 240-1 of the displayed set of menu items 230. Pressing button 182 again causes the cursor to move to another item in the list. Holding button 182 may repeat this action at a given repeat rate. In one embodiment, when the cursor is highlighting the last menu item, pressing button 182 causes the cursor to highlight the first item in the list. In another embodiment, when the cursor is highlighting the last item in the list, pressing button 182 causes the cursor to highlight the next menu and causes the display to show the menu items that correspond to the next menu.

For example, the user can sequentially move the cursor from the first item in the list, which is "new appointment" in this example, to the last item in the list which is "undelete from archives" in this example, by pressing button 182 several times, or by pressing and holding button 182 until the cursor reaches the desired item. When the cursor reaches the last item, pressing button 182 may cause the cursor to return to the first item in the displayed list. Thus, a user can move the highlight from item to item using button 182 to select different items without having to touch the screen.

Furthermore, the user may move the cursor through the list of menu items using button 181. For example, button 181 can be used to scroll the cursor through the items in an opposite direction to that of button 182. For example, if the cursor is highlighting the last item in the list, the button 181 can move the cursor to the previous item. The button 181 can move the cursor in this reverse direction sequentially through the items back to the first item in the list. When the cursor is highlighting the first item, executing button 181 can cause the cursor to move and highlight another menu in the menu bar as discussed above.

One or more of the keys may be used to execute a highlighted item. For example, when an item is highlighted by the cursor, an execution button such as menu button 180 for example can be used to execute the highlighted item. Also, another key such as a space key, or a return key for example, on keyboard 160 may execute the highlighted menu item when pressed.

In one embodiment, when any menu is displayed, pressing a short cut letter for a displayed menu item may execute the corresponding menu item. For example, when the record menu is displayed, pressing the B key on keyboard 160 causes the device to perform the beam item function. At any time, whether or not a menu is displayed, pressing the menu key and pressing one of the short cut letters may execute the corresponding menu item. Thus, a button or a sequence of buttons on keyboard 160 may be associated with a given menu item. The given item may be executed by pressing the button or sequence of buttons associated with the item, regardless of whether the item is highlighted or displayed. For example, if the record menu is not displayed, pressing command key 180 then pressing letter E causes the "purge items" command, which is listed in the record menu, to be performed. Whenever a menu command is executed, the displayed menu may be dismissed.

The rocker 165 can be used to move the cursor 220 through the menu bar 210 and through the list of items 230. For example, rotating, or moving, the rocker in a first direction, such as "up," can cause the cursor to scroll through the menus 215-1 to 215-D in the menu bar, to permit a user to highlight a desired menu. Thus, when the cursor is highlighting the first item, moving the rocker in the first direction may cause the cursor to highlight another menu, such as the edit menu. The items 230 associated with the highlighted menu may be displayed as discussed above.

Moving the jog rocker 165 in a second direction, such as "down," can cause the cursor to scroll through the displayed menu items to enable a user to highlight a desired item. For example, moving the rocker in the second direction can cause the cursor to scroll sequentially from the first item 240-1, "new appointment" to a subsequent item, such as "beam item" 240-5 in the list of items. When the cursor is highlighting the last item 240-n, moving the rocker in the second direction can cause the cursor to highlight the first item 240-1.

The user may also use the rocker to move the cursor through the menu items in the opposite direction. For example, when the cursor is highlighting an item other than the first item in the list, moving the rocker in the first direction causes the cursor to move to the previous item in the list. Thus, if the cursor is highlighting item 240-3, moving the rocker in the first direction causes the cursor to move to item 240-2.

When the location of cursor 220 overlaps the position of an item, the overlapping item is highlighted by the cursor. A highlighted item can be executed by using the rocker. For example, moving the rocker in a third direction, such as "pressing" the rocker for example, may cause the device to execute a highlighted item.

Figure 3:
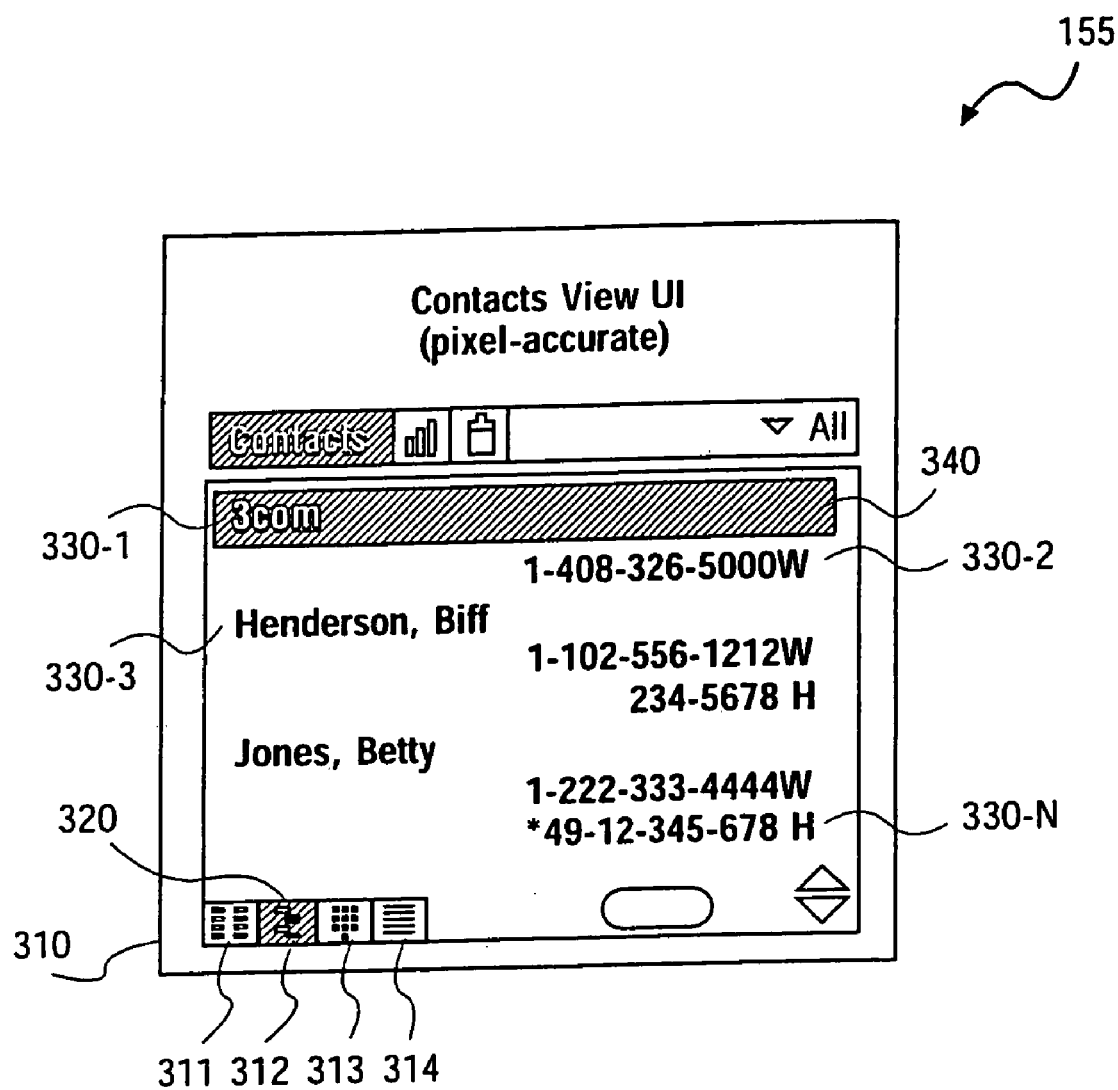
FIG. 3 shows an embodiment of a handheld computer screen shot displaying a contacts menu that can be navigated by using the keyboard of a handheld computer.

In an embodiment as shown in FIG. 3, one or more of the applications may be related to telephone functions or information. For example, if a telephone application is to be executed, pressing application key associated with the telephone application will cause the device to execute the telephone application. The telephone application may have multiple views, or sub-applications, which may be represented by icons in an icon row. Icon row 310 may include a speed dial icon 311, a contacts icon 312, a dial pad icon 313, and a call history icon 314. The icon row may also include a call screening icon 315, which has call screening functions and commands. In one embodiment, the user may toggle through the views of the application corresponding to the icons in icon row 310 by using a key such as application button 170 as shown in FIG. 1A for example. Therefore, each time the application button is pressed, another view of the telephone application is displayed.

As shown in FIG. 3, a cursor 320 is highlighting the contacts icon 312 on icon row 310, and the device displays the contacts view display screen 155. Menu items 330-1 to 330-N in the contacts view include the names of one or more contacts, along with the phone numbers for each contact. A user may scroll through the list of items in the contacts menu by using keys, such as buttons 181 and 182 or rocker 165 for example, to move menu item cursor 340. When a phone number is highlighted by menu item cursor 340, the user may dial the highlighted phone number by pressing one or more execution keys.

For example, pressing button 182 causes the menu item cursor 340 to move from the first item 330-1 to the second item, 330-2. When the menu item cursor 340 is highlighting item 330-2, pressing button 182 causes the menu item cursor 340 to move to item 330-3, and pressing button 181 causes the menu item cursor 340 to move back to item 330-1. In one embodiment, if the menu item cursor 340 is highlighting the first item in the list, item 330-1, pressing an execution key causes the device to display contact information, such as addresses, names, and phone numbers for example, that are related to the selected item.

Figure 4:
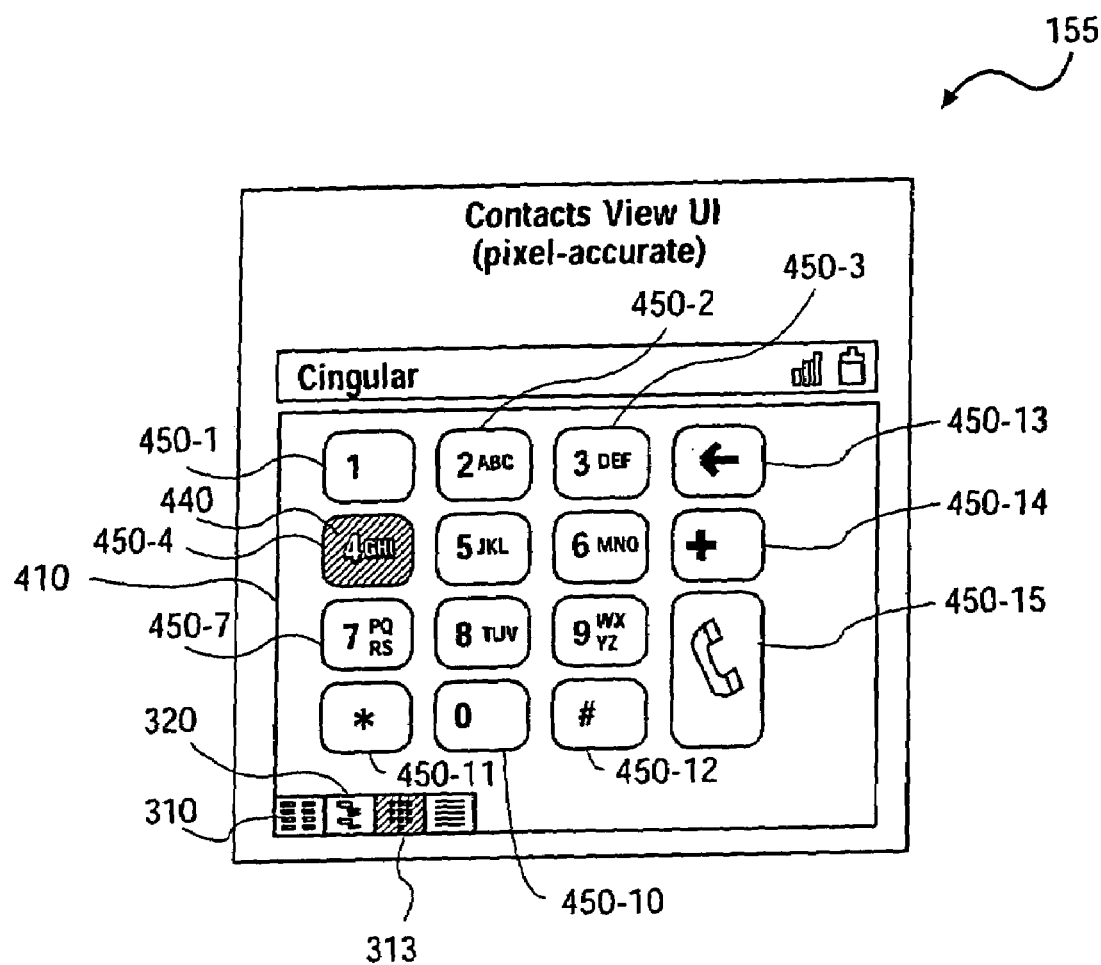
FIG. 4 shows an embodiment of a handheld computer screen shot displaying telephone dial pad that allows a user to dial a telephone number by using the keyboard of a handheld computer.

As shown in FIG. 4, cursor 320 is highlighting the dial pad icon 313. The display screen 155 displays the items 450-1 to 450-15 of the dial pad view, which include a telephone dial pad 410. The user may dial a telephone number by using numeric keys on the keyboard 160. The user may also select numbers by touching the desired numbers shown on display 155. Pressing a key such as button 181 or 182, or rocker 165, causes the display 155 to show a previously dialed number. Pressing the key again causes the display to scroll through a list of previously dialed numbers. The item 450-15 with the telephone symbol may dial the telephone number when it is selected by a user. Alternatively, the number may be dialed by pressing rocker 165.

Figure 5:
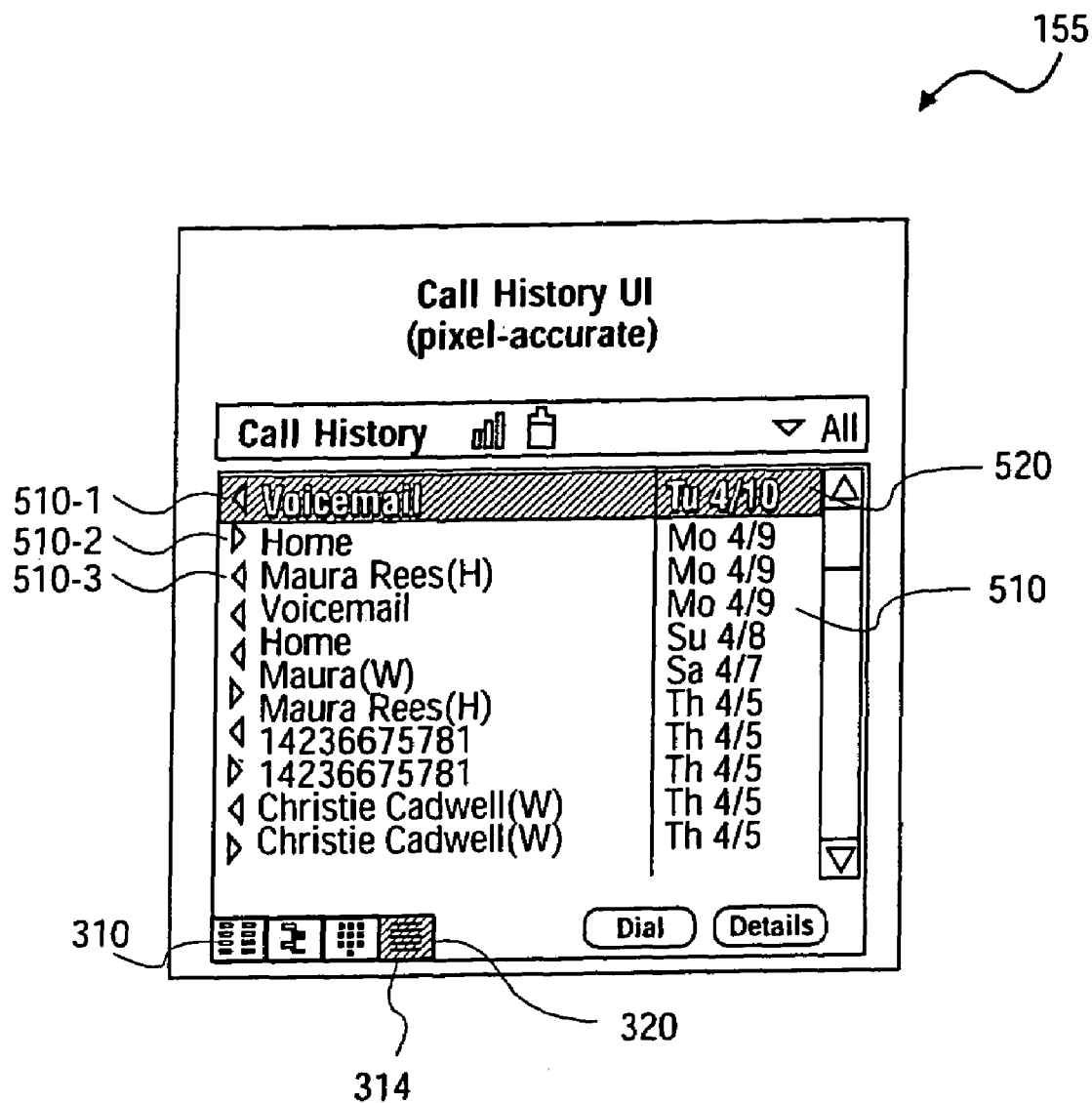
FIG. 5 shows an embodiment of a handheld computer screen shot showing a call history menu that can be navigated by using the keyboard of a handheld computer.

As shown in FIG. 5, the cursor 320 is highlighting the call history icon 314 of icon row 310. The display screen 155 displays the view corresponding to call history icon 314, including a menu list 510 of the names and dates corresponding to previous telephone calls made by the handheld device. A user may cause call history cursor 520 to scroll through the list 510 using keyboard keys or the jog rocker to move call history cursor 520. When a name is highlighted by call history cursor 520, the user may dial the corresponding telephone number by pressing one or more execute buttons.

For example, when call history cursor is highlighting menu item 510-1, pressing a such as button 182 causes the call history cursor 520 to move to the next item, which is 510-2. Pressing button 182 again causes the call history cursor 520 to move to item 510-3. When the cursor is highlighting item 510-2, pressing a key such as button 181 causes the cursor to move to the previous item, which is item 510-1.

Figure 6A:
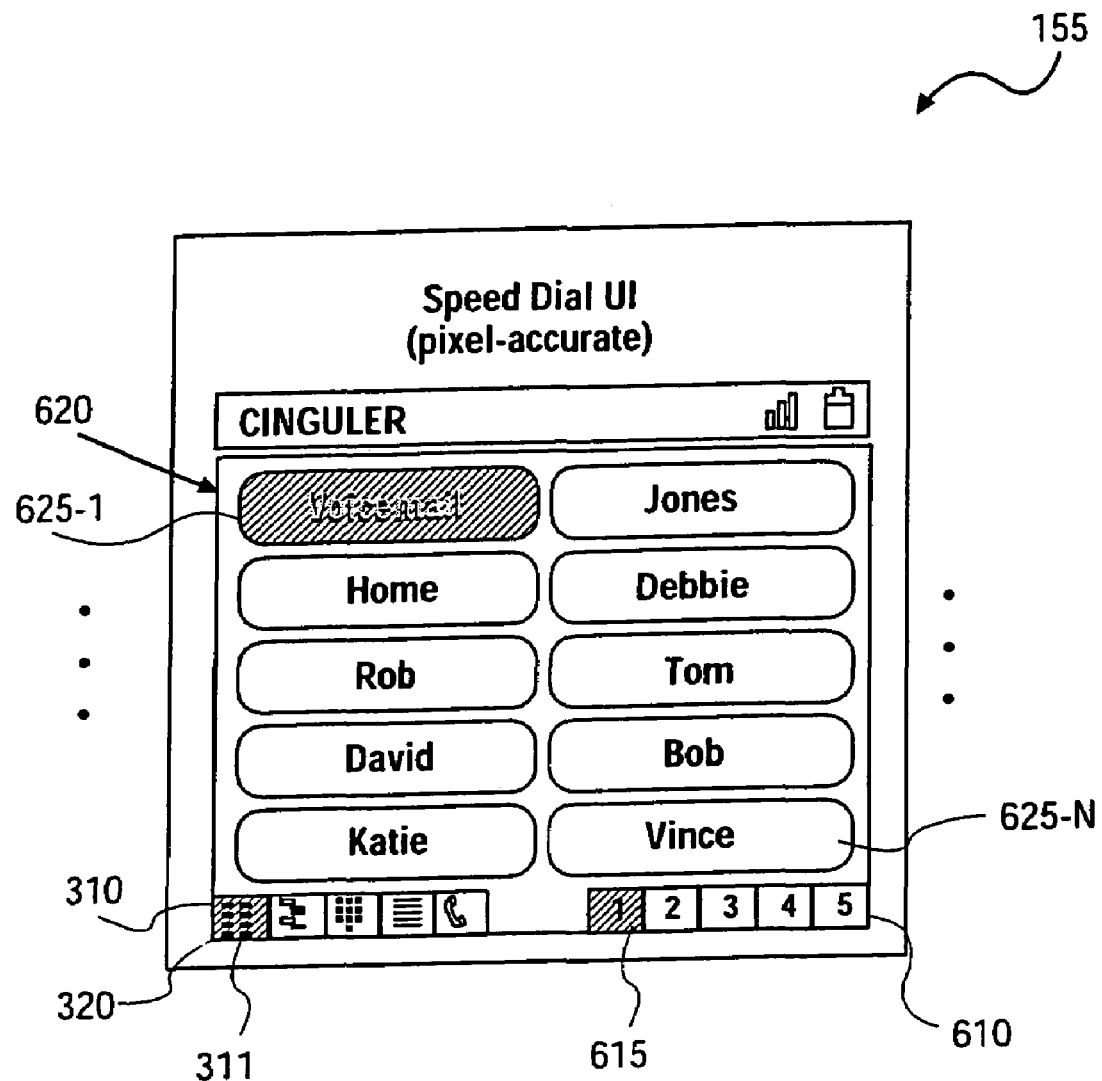
FIGS. 6A, 6B, and 6C show embodiments of screen shots showing a speed dial menu that can be navigated by using the keyboard of a handheld computer.

As shown in FIG. 6A, the cursor 320 is highlighting speed dial icon 311. The display screen 155 displays the speed-dial view corresponding to icon 311, which includes a page 620 of menu items containing names 625-1 through 625-N 625. Executing a name 625 on page 620 causes the device to dial a telephone number associated with the name. A user may scroll through the items, or names, on the page of menu items by using keys on the keyboard or using the rocker as discussed above.

Figure 6B:
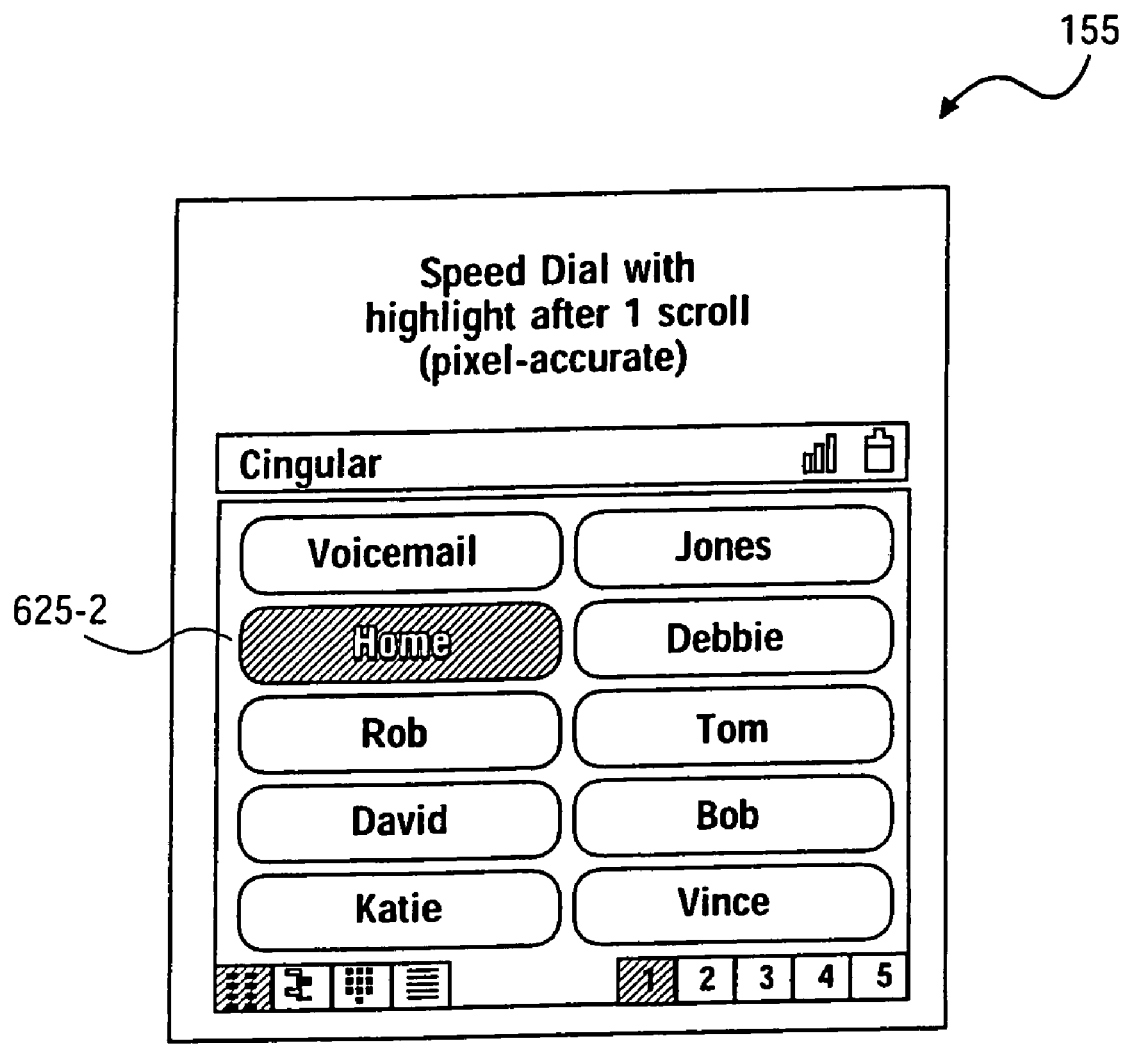
Figure 6C:
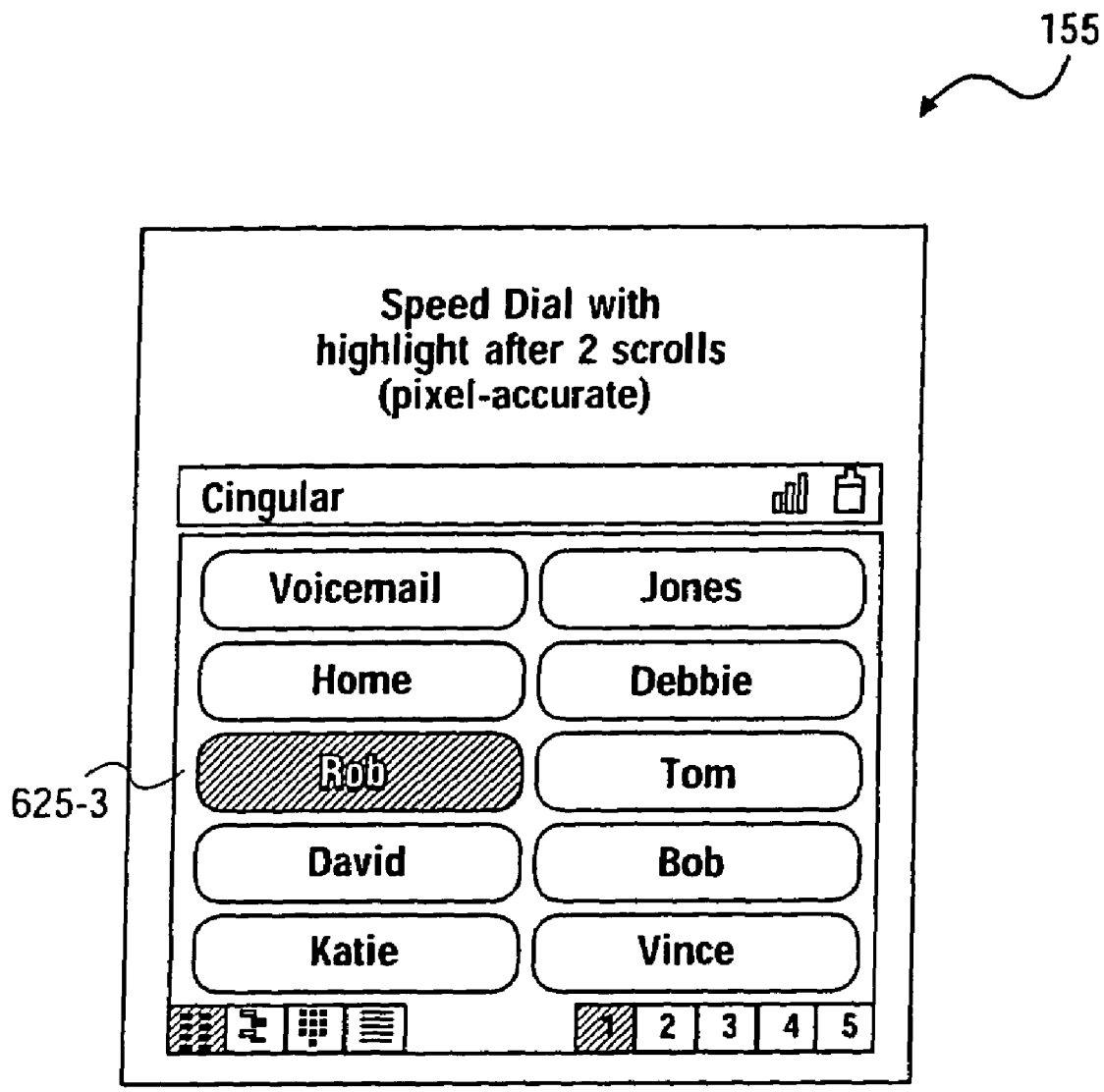

For example, pressing a key such as button 182 highlights the first name 625-1 in the list as shown in FIG. 6A. Pressing button 182 again highlights the second name 625-2 as shown in FIG. 6B. Pressing button 182 a third time highlights the third name 625-3 as shown in FIG. 6C. When the third name 625-3 is highlighted, pressing a key such as button 181 causes the cursor to scroll back to previous name 625-2. Pressing an execute key will dial the phone number associated with the highlighted name.

The number of pages on the speed dial menu item list is shown by page number menu bar 610. Page menu cursor 615 highlights the number of the page that is currently being displayed. A user may jump directly to a given page by pressing a key on the keyboard. For example, pressing the number "2" key causes the second page to be displayed. In one embodiment, after highlighting the last name on the displayed page, pressing scroll-down button 182 causes another page of names in the speed-dial list to be displayed. Also, if cursor 320 is highlighting the first entry on the displayed page, pressing scroll-up button 181 causes the display to show the next speed dial page, with cursor 320 highlighting the first entry on the next page.

Figure 7:
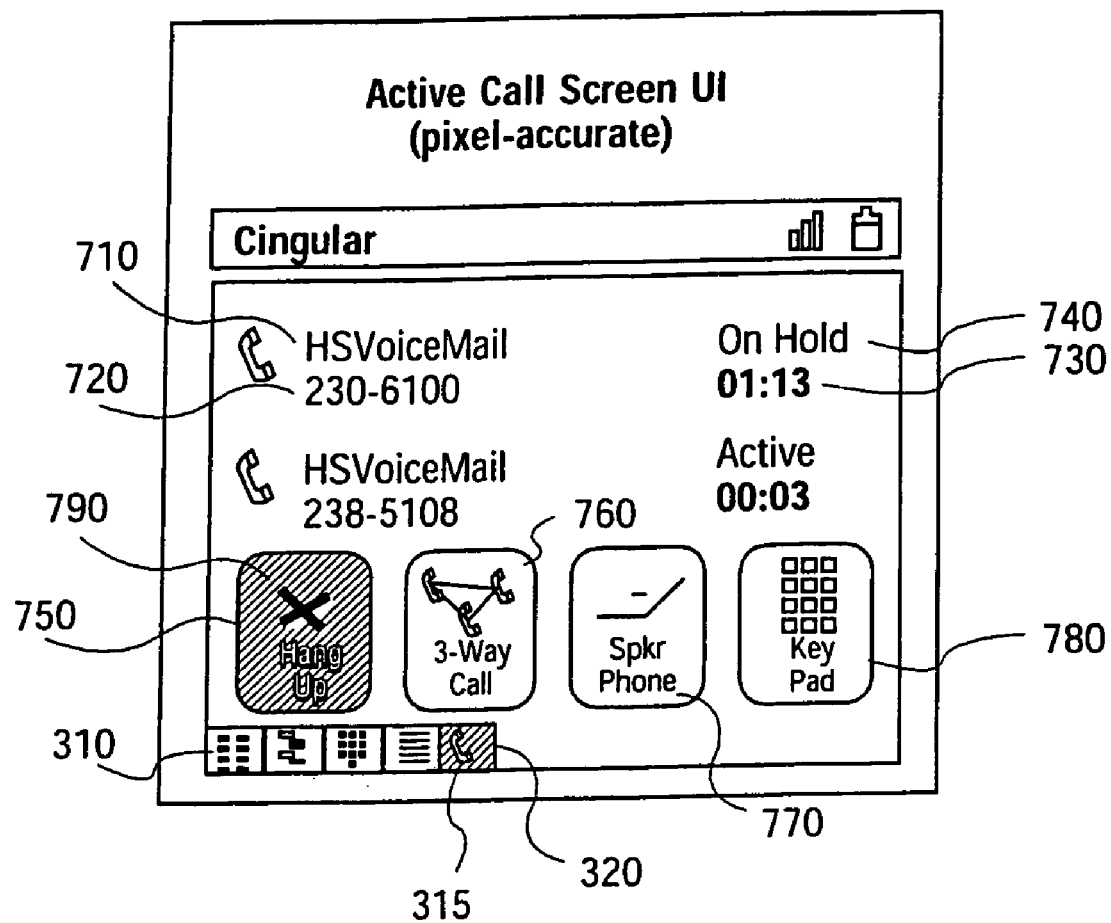
FIG. 7 shows an embodiment of a handheld computer screen shot displaying a call screening menu that can be navigated by using the keyboard of a handheld computer.

When the handheld device receives a telephone call, or has established a connection with another telephone, a call screening view may be displayed to identify one or more characteristics of each active telephone call. For example, when the device is engaged in a telephone call, the cursor 310 highlights call screening icon 315 and displays a call screening view, as shown in FIG. 7. The call screening view may be automatically displayed whenever a call is made or received by the device 100.

For example, when an incoming phone call is received, or an outgoing phone call is made, the display screen shows characteristics of the call, such as the name 710 and phone number 720 of the other telephone that is making or receiving the call. The telephone call characteristics may also include the duration of a phone call 730, or the status of a phone call 740, such as "on-hold" or "active" for example.

Also, the display may show menu items to perform telephone call management functions such as hang-up 750, 3-way call 760, speakerphone 770, or keypad 780 for example. As shown in FIG. 7, call screening cursor 790 is highlighting the hang-up function 750. A user may cause a call screening cursor to scroll through the telephone management functions of this menu and execute a desired function using the keys on the keyboard or using the rocker.

Thus, navigating through a list of menus and through items of a given menu using a keyboard of a handheld computer has been disclosed. The keyboard based navigation permits a person to operate a handheld computer without using a stylus. This navigation also permits a user to perform computer functions and communication functions from a single handheld computer, using only the keyboard of the handheld computer.

These and other embodiments of the present invention may be realized in accordance with the teachings described herein and it should be evident that various modifications and changes may be made in these teachings without departing from the broader spirit and scope of the invention. The specification and drawings are, accordingly, to be regarded in an illustrative rather than restrictive sense and the invention measured only in terms of the claims.

We claim:

1. A handheld device for navigating among a plurality of menus and within individual menus, each menu comprising at least one menu item, the device comprising:
   a first button to cause a cursor to navigate within a menu when no selection command has been received for the menu and to highlight a desired menu item within the menu; and
   a second button, wherein:
   when the cursor is highlighting one of the menus or a first menu item in a menu of the plurality of menus, the second button causes the cursor to navigate from one menu to another; and
   when the cursor is highlighting a menu item other than the first menu item in a menu of the plurality of menus, and no selection command has been received for the menu, the second button causes the cursor to navigate within the menu.

2. The device of claim 1 further comprising:
   a third button to cause the device to display the plurality of menus.

3. The device of claim 1 further comprising:
   an execute button to execute the highlighted item.

4. The device of claim 1 wherein the highlighted item is a telephone number.

5. The device of claim 4 further comprising:
   a button to dial the telephone number.

6. The handheld device of claim 1, wherein the first button is a scroll-up button.

7. The handheld device of claim 1, wherein the second button is a scroll-down button.

8. The handheld device of claim 1, wherein the first button is right arrow button.

9. The handheld device of claim 1, wherein the second button is a left arrow button.

10. A handheld device for navigating among a plurality of menus and within individual menus, each menu comprising at least one menu item, the device comprising:
    first means for causing a cursor to navigate within a menu when no selection command has been received for the menu and to highlight a desired menu item within the menu; and
    second means for causing the cursor to navigate from one menu to another when the cursor is highlighting one of the menus or a first menu item in a menu of the plurality of menus and for causing the cursor to navigate within the menu when the cursor is highlighting a menu item other than the first menu item in a menu of the plurality of menus and no selection command has been received from the menu.

11. The device of claim 10 further comprising:
    third means for causing the device to display the plurality of menus.

12. The device of claim 10 further comprising:
    execute means for executing the highlighted item.

13. The device of claim 10 wherein the highlighted item is a telephone number.

14. The device of claim 13 further comprising:
    means for dialing the telephone number.

15. A method performed by a handheld device for navigating among a plurality of menus and within individual menus, each menu comprising at least one menu item, the method comprising:
    using a first button to cause a cursor to navigate within a menu when no selection command has been received for the menu and to highlight a desired menu item within the menu; and using a second button to cause the cursor to navigate from one menu to another when the cursor is highlighting one of the menus or a first menu item in a menu of the plurality of menus and for causing the cursor to navigate within the menu when the cursor is highlighting a menu item other than the first menu item in a menu of the plurality of menus and no selection command has been received from the menu.

16. The method of claim 15 further comprising:
using a third button to display the plurality of menus.

17. The method of claim 15 further comprising:
using an execute button to execute the highlighted item.

18. The method of claim 15 wherein the highlighted item is a telephone number.

19. The method of claim 18 further comprising:
using a button to dial the telephone number.

20. An apparatus for navigating among a plurality of menus, the apparatus comprising:
a menu bar including a plurality of menus;
a set of items associated with each menu of the plurality of menus;
a display button to cause the menu bar including the plurality of menus to be displayed;
a first scroll button to cause a cursor to navigate within a menu when no selection command has been received for the menu and to highlight a desired menu item within the menu; and
a second scroll button, wherein:
when the cursor is highlighting one of the menus or a first menu item in a menu of the plurality of menus, the second button causes the cursor to navigate from one menu to another; and
when the cursor is highlighting a menu item other than the first menu item in a menu of the plurality of menus, and no selection command has been received for the menu, the second button causes the cursor to navigate within the menu.

21. A handheld device for navigating among a plurality of menus and within individual menus, each menu comprising at least one menu item, the device comprising:
a first button to cause a cursor to navigate within a menu when no selection command has been received for the menu and to highlight a desired menu item within the menu; and
a second button, wherein:
when the cursor is highlighting one of the menus or a last menu item in a menu of the plurality of menus, the second button causes the cursor to navigate from one menu to another; and when the cursor is highlighting a menu item other than the first menu item in a menu of the plurality of menus and no selection command has been received for the menu, the second button causes the cursor to navigate within the menu.

22. The handheld device of claim 21, wherein the first button is a scroll-up button.

23. The handheld device of claim 21, wherein the second button is a scroll-down button.

24. The handheld device of claim 21, wherein the first button is right arrow button.

25. The handheld device of claim 21, wherein the second button is a left arrow button.

26. A handheld device for navigating among a plurality of menus and within individual menus, each menu comprising at least one menu item, the device comprising:
a first button, wherein:
when the cursor is highlighting one of the menus or a last menu item in a menu, the first button causes the cursor to navigate from one menu to another; and
when the cursor is highlighting a menu item other than the first menu item in a menu of the plurality of menus and no selection command has been received for the menu, the first button causes the cursor to navigate within the menu; and
a second button, wherein:
when the cursor is highlighting one of the menus or a first menu item in a menu of the plurality of menus, the second button causes the cursor to navigate from one menu to another; and
when the cursor is highlighting a menu item other than the first menu item in a menu of the plurality of menus, and no selection command has been received for the menu, the second button causes the cursor to navigate within the menu.

27. The handheld device of claim 26, wherein the first button is a scroll-up button.

28. The handheld device of claim 26, wherein the second button is a scroll-down button.

29. The handheld device of claim 26, wherein the first button is right arrow button.

30. The handheld device of claim 26, wherein the second button is a left arrow button.

* * * * *